(12) United States Patent
Wartenberg

(10) Patent No.: US 10,205,139 B2
(45) Date of Patent: Feb. 12, 2019

(54) BATTERY MODULE HAVING A BATTERY MODULE COVER AND METHOD FOR PRODUCING A BATTERY MODULE COVER OF A BATTERY MODULE

(71) Applicants: Robert Bosch GmbH, Stuttgart (DE); Samsung SDI Co., Ltd., Yongin-si, Gyeonggi-do (KR)

(72) Inventor: Axel Wartenberg, Ludwigsburg (DE)

(73) Assignees: Robert Bosch GmbH, Stuttgart (DE); Samsung SDI Co., LTD., Yongin-Si, Gyeonggi-Do (KR)

( * ) Notice: Subject to any disclaimer, the term of this patent is extended or adjusted under 35 U.S.C. 154(b) by 170 days.

(21) Appl. No.: 14/647,545

(22) PCT Filed: Nov. 13, 2013

(86) PCT No.: PCT/EP2013/073685
§ 371 (c)(1),
(2) Date: May 27, 2015

(87) PCT Pub. No.: WO2014/082853
PCT Pub. Date: Jun. 5, 2014

(65) Prior Publication Data
US 2015/0311480 A1    Oct. 29, 2015

(30) Foreign Application Priority Data
Nov. 28, 2012 (DE) .................. 10 2012 221 751

(51) Int. Cl.
*B60L 3/12* (2006.01)
*H01M 2/04* (2006.01)
(Continued)

(52) U.S. Cl.
CPC ............. *H01M 2/0404* (2013.01); *B60L 3/12* (2013.01); *B60L 11/1864* (2013.01);
(Continued)

(58) Field of Classification Search
CPC .. H01M 2/0404; H01M 2/043; H01M 2/1077; H01M 2/206; H01M 2/30;
(Continued)

(56) References Cited

U.S. PATENT DOCUMENTS 6,255,014 B1 * 7/2001 Dougherty ............ H01M 2/043
429/161
7,504,178 B2 * 3/2009 Shimamura ........... H01M 2/348
429/159
(Continued)

FOREIGN PATENT DOCUMENTS

DE         198 47 190 A1    6/1999
DE    10 2011 002 415 A1    7/2012
(Continued)

OTHER PUBLICATIONS

International Search Report corresponding to PCT Application No. PCT/EP2013/073685, dated Feb. 13, 2014 (German and English language document) (7 pages).
(Continued)

*Primary Examiner* — Gregg Cantelmo
(74) *Attorney, Agent, or Firm* — Maginot, Moore & Beck LLP

(57) ABSTRACT

A battery module comprises at least one battery cell including two battery cell terminals. The battery module further comprises a battery module cover configured for connection to the battery module to cover at least part of the battery module. Conducting tracks configured for connection to at least one sensor in an electrically conductive manner are integrated in the battery module cover.

10 Claims, 4 Drawing Sheets

(51) Int. Cl.
| | |
|---|---|
| *H01M 2/10* | (2006.01) |
| *H01M 2/20* | (2006.01) |
| *H01M 2/30* | (2006.01) |
| *B60L 11/18* | (2006.01) |
| *H01M 10/42* | (2006.01) |
| *H01M 10/48* | (2006.01) |
| *H01M 10/0525* | (2010.01) |

(52) U.S. Cl.
CPC ......... *B60L 11/1879* (2013.01); *H01M 2/043* (2013.01); *H01M 2/1077* (2013.01); *H01M 2/206* (2013.01); *H01M 2/30* (2013.01); *H01M 2/305* (2013.01); *H01M 10/0525* (2013.01); *H01M 10/425* (2013.01); *H01M 10/482* (2013.01); *B60L 2240/545* (2013.01); *B60L 2240/547* (2013.01); *B60L 2240/549* (2013.01); *H01M 10/486* (2013.01); *H01M 2220/20* (2013.01); *H01M 2220/30* (2013.01); *Y02T 10/7011* (2013.01); *Y02T 10/7061* (2013.01)

(58) Field of Classification Search
CPC ............. H01M 2/305; H01M 10/0525; H01M 10/425; H01M 10/482; H01M 10/486; H01M 2220/20; H01M 2220/30; B60L 3/12; B60L 11/1864; B60L 11/1879; B60L 2240/545; B60L 2240/549; Y02T 10/7011; Y02T 10/7061
See application file for complete search history.

(56) References Cited

U.S. PATENT DOCUMENTS

| | | | | |
|---|---|---|---|---|
| 2006/0019155 | A1* | 1/2006 | Seman, Jr. | H01M 2/204 429/159 |
| 2009/0181288 | A1* | 7/2009 | Sato | H01M 2/1077 429/57 |
| 2010/0112425 | A1* | 5/2010 | Dunn | H01M 2/024 429/99 |
| 2010/0124693 | A1* | 5/2010 | Kosugi | G01R 31/3644 429/92 |
| 2010/0248008 | A1* | 9/2010 | Sugawara | H01M 2/1077 429/159 |
| 2011/0135970 | A1* | 6/2011 | Han | H01M 2/204 429/7 |
| 2011/0151301 | A1* | 6/2011 | Kim | H01M 2/1077 429/120 |
| 2013/0344362 | A1* | 12/2013 | Raisch | F28D 1/00 429/93 |

FOREIGN PATENT DOCUMENTS

| | | | |
|---|---|---|---|
| DE | 10 2012 205 019 A1 | 10/2013 | |
| JP | 2009-164085 A | 7/2009 | |
| WO | WO 0197583 A2 * | 12/2001 | ......... H01M 2/1066 |

OTHER PUBLICATIONS

Feldmann et al.; 3D-MID Technology; Kunststoffe International, www.kunststoffe.de/pe; Apr. 2004; Munich, Germany (German and English language document).

* cited by examiner

BATTERY MODULE HAVING A BATTERY MODULE COVER AND METHOD FOR PRODUCING A BATTERY MODULE COVER OF A BATTERY MODULE

This application is a 35 U.S.C. § 371 National Stage Application of PCT/EP2013/073685, filed on Nov. 13, 2013, which claims the benefit of priority to Serial No. DE 10 2012 221 751.7, filed on Nov. 28, 2012 in Germany, the disclosures of which are incorporated herein by reference in their entirety.

The present disclosure relates to a battery module having a battery module cover in which conductor tracks for sensors are integrated, and to a method for producing a battery module cover of a battery module.

BACKGROUND

Batteries, in particular lithium-ion batteries, are rechargeable electrical energy stores the use of which, for example in mobile telephones, laptop computers, portable consumer goods and hybrid or electric vehicles, is very widespread. Owing to an observed trend in recent years, it is to be expected that new batteries or battery systems, on which constantly increasing demands are placed, will increasingly be used in future. In addition to a high degree of safety and reliability which needs to be ensured, ever-increasing demands also arise owing to the ever-decreasing available installation space in the batteries or to the permissible weight of the batteries or battery systems. Furthermore, the batteries or battery systems must be efficient and cost-effective to produce.

Moreover, the use of so-called hard-case battery cells or of battery cells with hard-shell housings which have a prismatic or cylindrical housing is known from the prior art. Battery cells such as this can be, for example, lithium-ion battery cells, nickel-metal hydride battery cells, lithium metal-polymer battery cells or else other electrochemical energy stores which have an appropriate housing.

Individual battery cells, for example six or twelve lithium-ion battery cells, which are used in the automotive sector, are interconnected in series or in parallel to form a battery module. A plurality of battery modules are assembled to form a battery pack subunit and a plurality of battery pack subunits are in turn interconnected to form a battery pack. In order to meet the demand on the installation space mentioned above, the battery cells should be arranged as close to one another as possible.

FIG. 1 shows a battery module 50, a battery pack subunit 60 and a battery pack 70 from the prior art. In this example, the battery pack 50 comprises six battery cells 40 which are fixed by a belt or a steel strip. In FIG. 1, a total of eight such battery modules 50 are assembled to form a battery pack subunit 60, two of which battery pack subunits are in turn assembled in this example to form a battery pack 70. The battery cells 40 each have two battery cell terminals 11, 12, wherein the battery cell terminals 11, 12 of adjacent battery cells 40 within a battery module 50 are electrically conductively connected to one another.

What is increasingly challenging in the mechanical design of the battery modules is reducing the weight and achieving efficient construction and connection technology. In this case, the battery modules or the components thereof are increasingly important since they take up the largest part of the assembly time and account for the majority of the weight of the battery pack. For this reason, the greatest potential for saving weight and costs in the manufacture of a battery pack is in the standardization of the design of said battery pack. With such standardization, it is possible to achieve a streamlining effect which brings with it a decrease in costs.

One of the components of battery modules is their cover which is to be referred to henceforth as battery module cover. A battery module cover 30 from the prior art is shown in FIG. 1. This battery module cover 30 has rectangular cutouts 1 which are arranged parallel to the longer edges of the battery module cover 30. In this example of a battery module cover 30 from the prior art, the battery module cover 30 has in each case six rectangular cutouts 1 arranged along the longer sides of said battery module cover, wherein in each case two cutouts 1 lie opposite one another symmetrically to an imagined axis of symmetry which runs through the battery module cover 30 centrally and parallel to the longer sides or edges of the battery module cover 30. The battery cell terminals 11, 12 of six battery cells in total can be guided through said cutouts 1. In this example, battery cell connectors 8 with openings which correspond to the cutouts 1 are screwed on the battery module cover 30. If a battery module 50 as illustrated in FIG. 1 is connected to the battery module cover 30 illustrated in FIG. 2, the battery cells 40, of which there are six in this example, of the battery module 50 are connected in series via the battery cell connectors 8 of the battery module cover 30. Furthermore, the battery module cover 30 illustrated in FIG. 2 has cables 7 which are electrically connectable to the battery cell terminals 11, 12 of the battery cells 40 and are connectable to a sensor and via which, for example, measurements for determining the state of charge, the temperature or the no-load voltage of all of the battery cells 40 or of individual battery cells 40 can be performed or other data which is necessary for monitoring all of the battery cells 40 or individual battery cells 40 can be transmitted.

In addition, a battery module which has a battery module cover for protecting the battery module and via which the battery module can additionally be fixed in a motor vehicle is known from JP 2009-164085 A.

SUMMARY

According to the disclosure, provision is made of a battery module which comprises at least one battery cell, which has two battery cell terminals. The battery module also comprises a battery module cover, which is connectable to the battery module, for covering at least a part of the battery module. According to the disclosure, conductor tracks are integrated in the battery module cover, which conductor tracks are electrically conductively connectable to at least one sensor.

The advantage of the battery module according to the disclosure is in the space-saving and cost-saving realization of the battery module cover thereof, in which a sensor cable no longer needs to be built or laid. By the replacement, according to the disclosure, of the sensor cable with conductor tracks integrated in the battery module cover, the battery module therefore becomes lighter, less expensive and more compact in construction. Furthermore, the battery module according to the disclosure is better protected against moisture penetration and has better electrical insulation compared to the battery modules from the prior art.

In a preferred embodiment, the conductor tracks integrated in the battery module cover are electrically conductively connected to a plug connector connected or connectable to the battery module cover. As a result of this, the conductor tracks integrated in the battery module cover can be electrically conductively connected to various sensors by means of which the measured values provided by the integrated conductor tracks, for example voltages tapped at the battery cell terminals of the battery cells or other data which is necessary for monitoring the battery cells, can be evaluated.

Preferably, the battery module cover is embodied as a three-dimensional injection-molded circuit carrier. Such circuit carriers, also referred to as molded interconnected devices, are molded components with integrated conductive pattern. In the case of such an embodiment, the battery module cover does not need to be assembled from different individual parts, which enables efficient production of the battery module cover.

Preferably, the battery module cover is embodied as a high-temperature thermoplastic with integrated, patterned metalization. In the case of such an embodiment, the electrical lines, for example for electrical connection of a sensor to the battery cell terminals of the battery cells, are already realized as conductor tracks in the battery module cover after manufacture thereof.

Preferably, the battery module cover also has seals and/or battery cell connectors.

Preferably, the seals and/or the battery cell connectors are injected into the battery module cover. As a result of this, sealing of the battery modules or interconnection of the battery cells of the battery module, for example connection in series or in parallel of the battery cells, can already be performed in a cost-effective manner when the battery module cover is manufactured.

In a preferred embodiment, the material of which the seals are composed comprises ethylene propylene diene (monomer) rubber (EPDM). EPDM is a rubbery-elastic substance which can be stretched by up to 500% at temperatures of between −40° C. and +120° C. and has an expected service life of decades.

Furthermore, the seals preferably consist of ethylene propylene diene (monomer) rubber (EPDM).

Preferably, the battery module has at least two battery cells and the battery module cover has at least one battery cell connector which is configured to electrically conductively connect a battery cell terminal of one of the battery cells to a battery cell terminal of the other battery cell.

Furthermore, the conductor tracks which are integrated in the battery module cover are preferably electrically conductively connected to the battery cell connector.

In addition, what is provided is a method for producing a battery module cover of a battery module, said method comprising the following steps: producing a battery module cover blank which acts as a circuit carrier, complete metalization of the battery module cover blank which acts as a circuit carrier, patterning the circuit carrier, and performing additive metalization of the circuit carrier.

In a preferred further development, the method for producing a battery module cover of a battery module also comprises the step of injecting seals and/or battery cell connectors into the circuit carrier. By using such a method for producing the battery module cover of a battery module, it is possible to fuse both the cables or lines of the battery module cover and the seals or the battery cell connectors of the battery module cover to form one component in one production process using a multifunctional construction technique.

In the method for producing a battery module cover of a battery module, the step of producing and/or the step of injecting preferably comprise(s) one-component injection molding or two-component injection molding. The one-component or multi-component injection molding process offers improved design flexibility and environmental-friendliness as well as a high potential for streamlining in the production of the battery module cover in comparison with many other production or manufacturing methods.

Furthermore, what is provided is a battery having a battery module according to the disclosure, wherein the battery is particularly preferably designed as a lithium-ion battery. Advantages of such batteries are found, inter alia, in their comparatively high energy density and their high thermal stability. Another advantage of lithium-ion batteries is that they do not suffer from any memory effect.

Furthermore, what is provided is a motor vehicle with a battery having a battery module according to the disclosure, wherein the battery is connected to a drive system of the motor vehicle.

Advantageous developments of the disclosure are specified in the dependent claims and described in the description.

BRIEF DESCRIPTION OF THE DRAWINGS

Exemplary embodiments of the disclosure are explained in more detail with reference to the drawings and the following description. In the figures.

DETAILED DESCRIPTION

Figure 1:
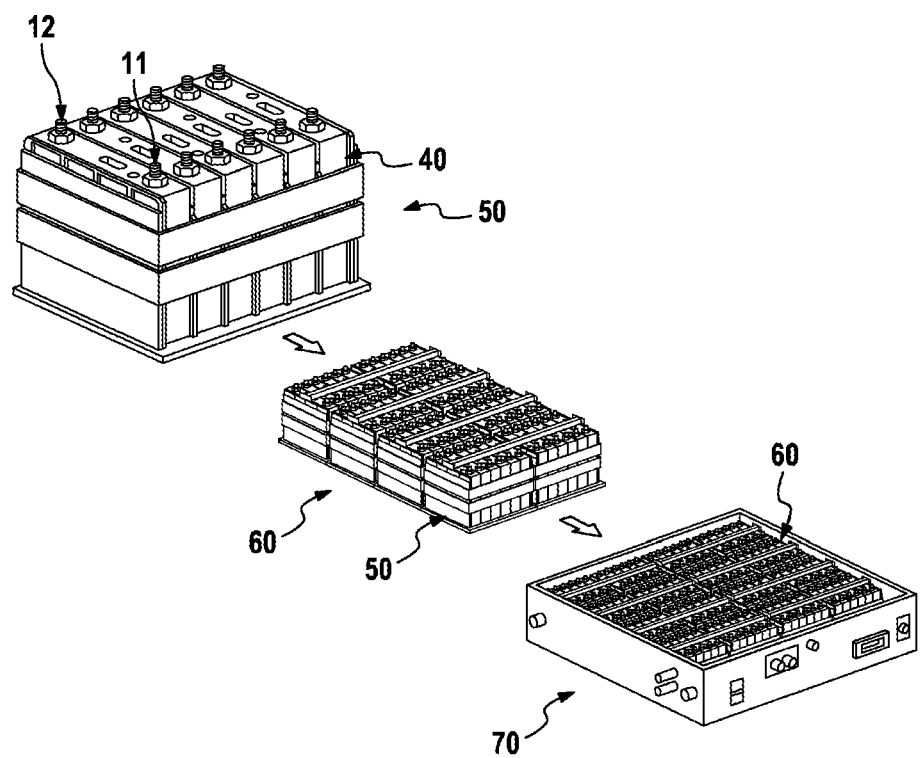
FIG. 1 shows a battery module 50, a battery pack subunit 60 and a battery pack 70 of the prior art.
Figure 3:
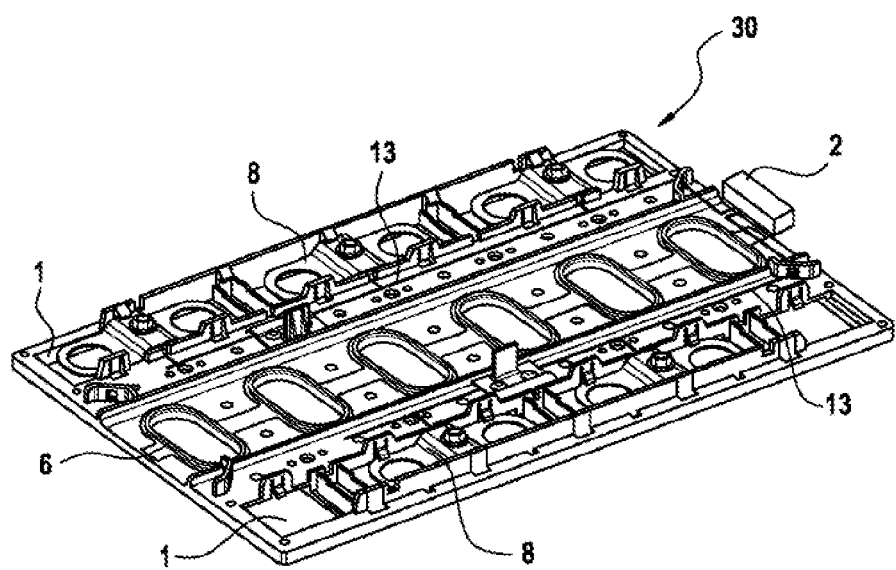
FIG. 3 shows an exemplary embodiment of a battery module cover of a battery module according to the disclosure.

FIG. 3 illustrates an exemplary embodiment of a battery module cover 30 of a battery module 50 according to the disclosure. In this exemplary embodiment, the battery module 50—not shown in FIG. 3—has, purely by way of example, six battery cells 40 which each have battery cell terminals 11 and 12. The battery module cover 30 shown in FIG. 3 is, purely by way of example, connectable in a fitting manner to the battery module 50 illustrated in FIG. 1. However, battery modules 50 according to the disclosure which have more or fewer battery cells 40 than the battery module 50 illustrated in FIG. 1 may also be realized. Furthermore, battery modules 50 according to the disclosure which have a different construction than the battery module 50 shown in FIG. 1 may be realized.

The battery module cover 30 illustrated in FIG. 3 is connectable to the battery module 50. In this exemplary embodiment, the battery module cover 30 is designed to cover the majority of the top of the battery module 50, that is to say that side of the battery module 50 on which the battery cell terminals 11, 12 of the battery cells 40 of the battery module 50 are located. However, battery modules 50 according to the disclosure with battery module covers 30 may also be realized, which battery module covers are designed to cover another part or another side or another area of the battery module 50. Conductor tracks 13 are integrated in the battery module cover 30 and are electrically conductively connectable to a sensor. In other words, the battery module cover 30 in this exemplary embodiment has electrical conductor tracks 13 metalized therein or thereon, which conductor tracks are electrically connectable to a sensor. In this case, the electrical conductor tracks 13 in other exemplary embodiments of the battery module covers 30 of battery modules 50 according to the disclosure can also be connectable or connected to more than one sensor.

Figure 2:
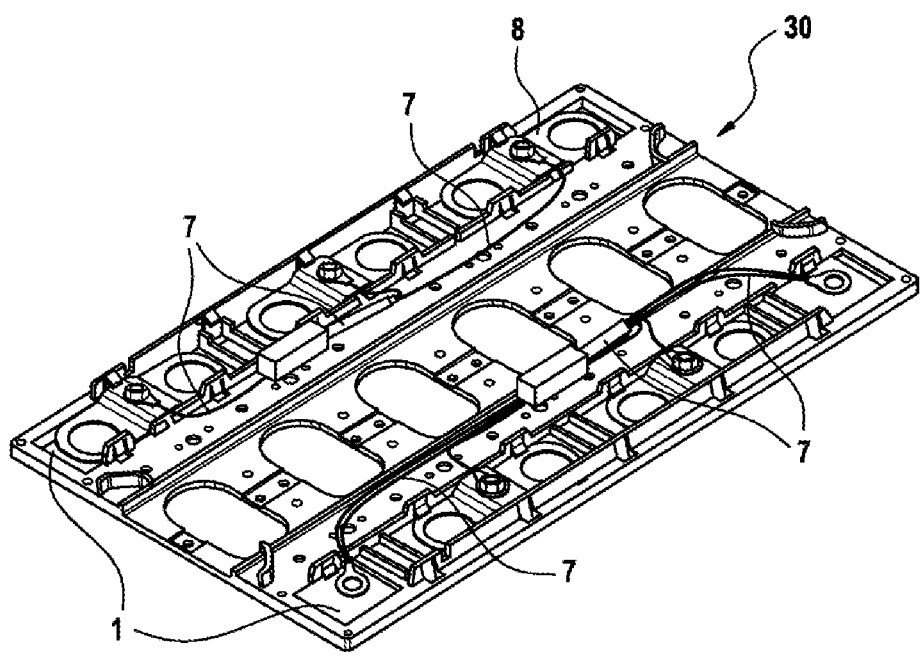
FIG. 2 shows a battery module cover 30 of the prior art.

In this exemplary embodiment, the battery module cover 30 has openings or cutouts 1 which are arranged, like those of the battery module cover 30 of the prior art illustrated in FIG. 2, such that the battery cell terminals 11, 12 of the battery cells 40 can be guided through said cutouts 1 or openings in the assembled state of the battery module cover 30. In order for the battery cell terminals 11, 12 of the battery cells 40 to make electrical contact with one another, the battery module cover 30 in this exemplary embodiment has, purely by way of example, battery cell connectors 8, the openings of which correspond to the cutouts 1 and through which the battery cell terminals 11, 12 can likewise be guided. The battery cell connectors 8 are designed to electrically conductively connect in each case one battery cell terminal 11 or 12 of a first battery cell 40 to a battery cell terminal 11 or 12 of a further battery cell 40 which is next to the one first battery cell 40. In the exemplary embodiment of FIG. 3, the battery cell connectors 8 are arranged such that the battery cells 40 are connected in series when the battery module cover 30 is assembled. However, battery modules 50 according to the disclosure with battery module covers 30 can also be realized, in which the battery cell connectors 8 are arranged such that the battery cells 40 of the battery module 50 are connected in parallel with one another or are otherwise connected when the battery module cover 30 is assembled.

In this exemplary embodiment of the battery module cover 30, the conductor tracks 13 which are integrated in said battery module cover are optionally electrically conductively connected to all of the battery cell connectors 8. The conductor tracks which are integrated in the battery module cover 30 may alternatively also be connected to only one battery cell connector 8, for example, or to more than one battery cell connector 8. Furthermore, the conductor tracks 13 which are integrated in the battery module cover 8 are connected in this exemplary embodiment, purely by way of example, to a plug connector 2 which is connected to the battery module cover 30. By way of example, a sensor can be connected to such a plug connector 2, with the result that measured data from the battery cell connectors 8 or via these from the battery cell terminals 11, 12 can be transmitted via the conductor tracks 13 which are integrated in the battery module cover 30 to the sensor via the conductor tracks 13.

In this exemplary embodiment, the battery module cover 30 is designed, purely by way of example, as a three-dimensional injection-molded circuit carrier. In other words, the battery module cover 30 in this exemplary embodiment is designed as a so-called molded interconnected device. Furthermore, the battery module cover 30 in this exemplary embodiment is, purely by way of example, a high-temperature thermoplastic with integrated, patterned metalization. In the center of the battery module cover 30, there are openings which are optionally rounded and which, in this embodiment, correspond, purely by way of example, to the configuration of the battery cell tops, that is to say the tops of the battery cell housings of the battery cells 40 of the battery module 50, with the result that, in the assembled state of the battery module cover 30, in this exemplary embodiment, in each case one of the central openings of the battery module cover 30 is located centrally above the outside of in each case one battery cell top.

In this exemplary embodiment, seals 6 are optionally injected into the openings which are arranged centrally in the battery module cover 30. In the assembled state of the battery module cover 30, the gap between the battery module cover 30 and the battery cells 40 can be sealed by means of said seals 6 against liquid penetrating the battery module 50 from the outside and, in addition, against possible escape of chemicals, for example the electrolytes contained in the battery cells 40. Furthermore, in this exemplary embodiment, purely by way of example, the battery cell connectors 8 are also injected into the battery module cover 30. However, even this is only optional for a battery module 50 according to the disclosure. Therefore, battery modules 50 according to the disclosure with battery module covers 30 may also be realized in which only the battery cell connectors 8 or only the seals 6 or neither the seals 6 nor the battery cell connectors 8 are injected.

In this embodiment, the material of which the seals 6 are composed comprises, purely by way of example, ethylene propylene diene (monomer) rubber (EPDM). However, the material of which the seals 6 consist can also comprise other substances and, in particular, other rubbery-elastic substances in other exemplary embodiments of battery modules 50 according to the disclosure.

Figure 4:
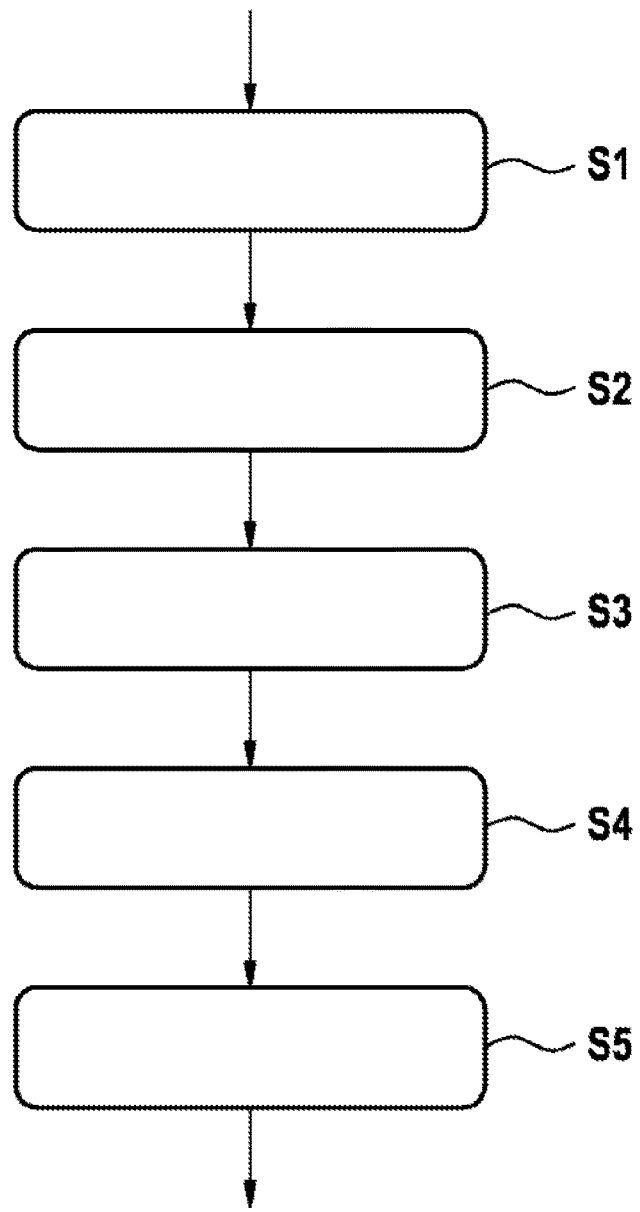
FIG. 4 shows a diagram of an exemplary embodiment of a method according to the disclosure for producing a battery module cover of a battery module.

FIG. 4 shows a diagram of an exemplary embodiment of a method according to the disclosure for producing a battery module cover 30 of a battery module 50. In this exemplary embodiment, five method steps S1 to S5 are illustrated, wherein the fifth method step S5 of this exemplary embodiment is optional for performing a method according to the disclosure. In the first method step S1, a battery module cover blank which acts as a circuit carrier is produced. In this exemplary embodiment of the method according to the disclosure, this occurs, purely by way of example, by means of two-component injection molding, that is to say by means of the technique of two-component injection molding. However, a one-component injection molding process, that is to say the technique of one-component injection molding or the so-called insert molding, which is a particular form of injection molding, or else an entirely different technique can also be used for the production of the battery module cover blank which acts as a circuit carrier. By way of example, the battery module cover blank can already be in the shape of a finished battery module cover 30 but without patterning for the conductor tracks 13, or without conductor tracks 13 themselves.

In the second method step S2, the battery module cover blank which acts as a circuit carrier is metalized over its full area, that is to say completely. In other words, the battery module cover blank which acts as a circuit carrier is completely covered by a metal. This can be done, for example, by means of a chemical or mechanical PVD process, that is to say by means of a chemical or mechanical, physical vapor deposition, or else in any other way.

The metalization, that is to say the metal coating of the battery module cover blank which acts as a circuit carrier is then patterned. In the third method step S3, the patterning for the conductor tracks 13 which are to be realized later is therefore performed in the metal coating of the battery module cover 30. In this case, for example, a 3D mask or a laser resist process or a laser direct process can be used. Furthermore, the patterning can be realized, purely by way of example, by laser activation or a so-called primer pad printing process or else using a forming punch, an injection-molding tool, a convex flexible foil or else in any other way.

In the fourth method step S4, the circuit carrier is then additively metalized, as a result of which the conductor tracks 13 are achieved in the battery module cover blank. This can be done, for example, by means of printing technology such as "Flamecon" technology, an aerosol jet technology, an inkjet technology, by means of chemical or electrical processes or else in any other way, for example by hot foil stamping.

After the fourth method step S4 has ended, the battery module cover 30 resulting therefrom can already be used to cover a battery module 50. In this exemplary embodiment, in the fifth method step S5, optional seals 6 and battery cell connectors 8 are injected into the circuit carrier or into the battery module cover 30. It is also optional for only the seals 6 and no battery cell connectors 8 or else only the battery cell connectors 8 and no seals 6 to also be able to be injected into the battery module cover 30. As already mentioned, however, methods according to the disclosure can also be realized entirely without the injection of seals 6 and/or battery cell connectors 8.

Thus, the production of a battery module cover 30 according to the disclosure including seals 6, battery cell connectors 8 and conductor tracks 13 which are integrated in the battery module cover 30 is possible with the method according to the disclosure.

The invention claimed is:

1. A battery module comprising:
   at least one battery cell, each battery cell of the at least one battery cell including two battery cell terminals; and
   a battery module cover connected to the at least one battery cell so as to cover at least a part of the at least one battery cell, the battery module cover including:
      conductor tracks, which are electrically conductively connectable to at least one sensor, integrated in the battery module cover, and
      a plurality of seals integrated into the battery module cover; wherein the battery module cover defines a plurality of openings, and the plurality of seals includes one seal arranged at each opening of the at least one opening and wherein the plurality of openings are centered along a longitudinal axis of the battery module cover.

2. The battery module as claimed in claim 1, further comprising:
   a plug connector configured for connection of the at least one sensor to the battery module cover, the conductor tracks electrically conductively connected to the plug connector.

3. The battery module as claimed in claim 1, wherein the battery module cover is embodied as a three-dimensional injection-molded circuit carrier.

4. The battery module as claimed in claim 3, wherein the battery module cover is embodied as a high-temperature thermoplastic with the conductor tracks integrated into the high-temperature thermoplastic as patterned metalization.

5. The battery module as claimed in claim 1, the battery module cover comprising:
   a plurality of battery cell connectors, each of which is electrically connected to one of the two battery cell terminals of at least one cell of the at least one battery cell.

6. The battery module as claimed in claim 1, wherein the plurality of seals are injected into the battery module cover.

7. The battery module as claimed in claim 1, wherein the plurality of seals comprise ethylene propylene diene (monomer) (EPDM) rubber material.

8. The battery module as claimed in claim 1, wherein each opening of the plurality of openings is located centrally above the outside of a respective battery cell top of one battery cell of the at least one battery cell, and a corresponding seal of the plurality of seals is configured to seal against the respective battery cell top so as to disable liquid from penetrating inside the battery module.

9. A battery comprising:
   a battery module comprising:
      at least one battery cell, each battery cell of the at least one battery cell including two battery cell terminals, and
      a battery module cover connected to the at least one battery cell so as to cover at least a part of the battery module, the battery module cover including:
         conductor tracks, which are electrically conductively connectable to at least one sensor, integrated in the battery module cover, and
         a plurality of seals integrated in the battery module cover; wherein the battery module cover defines a plurality of openings, and the plurality of seals includes one seal arranged at each opening of the at least one opening and wherein the plurality of openings are centered along a longitudinal axis of the battery module cover.

10. The battery of claim 9, wherein the battery is connected to a drive system of a motor vehicle.

* * * * *